(12) United States Patent
Jeon

(10) Patent No.: US 6,634,987 B2
(45) Date of Patent: Oct. 21, 2003

(54) CREEP-CONTROL METHOD FOR AN AUTOMATIC TRANSMISSION OF A VEHICLE

(75) Inventor: Byeong-Wook Jeon, Kyungki-do (KR)

(73) Assignee: Hyundai Motor Company, Seoul (KR)

(*) Notice: Subject to any disclaimer, the term of this patent is extended or adjusted under 35 U.S.C. 154(b) by 6 days.

(21) Appl. No.: 09/995,622

(22) Filed: Nov. 29, 2001

(65) Prior Publication Data
US 2002/0065166 A1 May 30, 2002

(30) Foreign Application Priority Data
Nov. 30, 2000 (KR) .................................... 2000-71894

(51) Int. Cl.⁷ .............................................. F16H 61/20
(52) U.S. Cl. ..................................................... 477/114
(58) Field of Search ................................. 477/114, 125, 477/127, 131

(56) References Cited

U.S. PATENT DOCUMENTS 5,329,830 A * 7/1994 Kitagawa et al. ........... 477/117
5,662,548 A * 9/1997 Mori ........................... 477/114
5,931,883 A * 8/1999 Ghil ............................. 701/51

* cited by examiner

Primary Examiner—Charles A. Marmor
Assistant Examiner—Dennis Abdelnour
(74) Attorney, Agent, or Firm—Birch, Stewart, Kolasch & Birch, LLP

(57) ABSTRACT

The present invention provides a creep-control method for an automatic transmission of a vehicle comprising: creep-entering, in which a hydraulic circuit of the automatic transmission is controlled to form hydraulic pressure supply lines of a second shift-speed when a predetermined creep-entrance condition is satisfied; creep-maintaining, in which the formed hydraulic pressure supply lines of the second shift-speed are maintained and a hydraulic supply pressure of the formed hydraulic pressure supply lines is maintained at a predetermined creep duty ratio; and creep-escaping, in which one of controlling the hydraulic circuit to engage the second shift-speed shift mechanism of the automatic transmission and controlling the hydraulic circuit to engage a first shift-speed shift mechanism of the automatic transmission is selectively performed based on a vehicle speed and throttle valve open-angle when, a predetermined creep-escape condition is satisfied.

7 Claims, 5 Drawing Sheets

CREEP-CONTROL METHOD FOR AN AUTOMATIC TRANSMISSION OF A VEHICLE

CROSS-REFERENCE TO RELATED APPLICATION

This application claims priority of Korea patent Application No. 10-2000-71894, filed on Nov. 30, 2000.

BACKGROUND OF THE INVENTION (a) Field of the Invention

The present invention relates to a creep-control method for an automatic transmission of a vehicle, and more particularly, to a creep-control method wherein a second shift-speed is maintained to prevent rearward rolling on a slope and shift shock is reduced by optimal shift control from the second shift-speed to a target shift-speed when a creep-control state is released.

(b) Description of the Related Art

A conventional automatic transmission, equipped with a torque converter, performs shift control based on a variety of inputs regarding a driving state of a vehicle.

FIG. 1 shows a block diagram of a control apparatus for a conventional automatic transmission.

As shown in FIG. 1, the control apparatus includes a driving-state detecting unit 10 for detecting a plurality of vehicle driving-state factors, a transmission control unit (referred to as "TCU" hereinafter) 20 for determining an optimal shift pattern for the detected driving state and for controlling hydraulic shifting according to the determined optimal shift pattern, and an actuator unit 30 for performing hydraulic shifting according to the control of the TCU 20.

The driving-state detecting unit 10 includes a throttle valve open-angle detector 11 for detecting an open-angle of the throttle valve, a vehicle speed detector 12 for detecting a speed of the vehicle, a shift-lever position detector 13 for detecting a position of the shift lever, a turbine-speed detector 14 for detecting a revolution speed of the turbine in a torque converter (not shown), and an engine-speed detector 15 for detecting a revolution speed of the engine.

When the shift-lever is in a forward range such as a drive "D" range, a second "2" range, and a low "L" range, rotational torque of the engine is transmitted to an output shaft of the automatic transmission even if the vehicle is stopped because the transmission maintains a predetermined shift-speed. The control of the transmission to maintain the predetermined shift-speed at a very low vehicle speed is called creep-control, and the phenomenon whereby rotational torque is transmitted to the output shaft under creep-control is called a creep phenomenon. The predetermined shift-speed can be either of the first shift-speed and the second shift-speed.

FIGS. 2a, 2b, 2c, 3a, and 3b are speed diagrams for a conventional four-speed automatic transmission, wherein FIG. 2a shows a state in which the vehicle is driven in a first shift-speed, and FIG. 3a shows a state in which the vehicle is driven in a second shift-speed.

A shift mechanism of the transmission receives engine torque via a turbine of a torque converter through a rear clutch in the first and second shift-speeds. Therefore, the revolution speed of the rear clutch in the first and second shift-speeds can be understood as the revolution speed of an input element of the shift mechanism in those shift-speeds.

In the second shift-speed where a kick-down band brake is operated, a first operating element N1 as shown in the far right of FIG. 3a is stopped.

In the first shift-speed, the rear clutch N4 and the first operating element N1 revolve at opposite sides of a one-way clutch OWC.

More particularly, the first operating element N1 rotates in an opposite direction to the rotation of the rear clutch N4, the rear clutch N4 acting as an input element in the first shift-speed, because a second operating element on which the one-way clutch OWC acts is prevented from rotating backward.

Therefore, in a normal driving state, the rotational speed of the input element of the rear clutch N4 is changed according to the speed diagram of FIG. 2a and is transmitted to an output element of a third operating element N3.

However, when the vehicle is stopped, the output element of the third operating element N3 is also stopped. Therefore, the rear clutch N4, engaged with the third operating element through a gear mechanism, is also stopped. Accordingly, revolution speeds of each of the first, second, third, and fourth operating elements N1, N2, N3, and N4 are as shown in FIG. 2b.

A difference between the engine speed and the revolution speed of the rear clutch N4 implies that slip corresponding to the speed difference occurs in the torque converter.

The torque converter transmits engine torque to the shift mechanism when slip occurs, and accordingly the shift mechanism of the automatic transmission changes revolution speed and torque of the engine, and outputs the changed speed and torque through the output element. Therefore, the output torque acts as a driving torque of the vehicle.

The driving torque of the vehicle acts as a driving force to drive the vehicle on a plane even when an accelerator pedal is not depressed, and it also acts as a force that prevents rearward rolling when the vehicle is stopped on a slope.

However, if the driving torque output from the output element is not sufficient, the vehicle may roll rearward on a steep slope when a driver takes his/her foot from a brake pedal.

FIG. 2c shows how the speed diagram may be changed when a vehicle is stopped on a slope and a brake pedal is released.

Gravitational force acts rearward on the vehicle when the vehicle is stopped on a slope and a brake pedal is released. However, the second operating element N2 cannot have a negative revolution speed rate because of the one-way clutch OWC if the shift mechanism of the automatic transmission is set to the first shift-speed.

Therefore, if the torque transmitted to the shift mechanism is not sufficient, the speed diagram can pivot anti-clockwise around the center of the second operating element N2, and accordingly the output element N3 can turn backward, which implies that the vehicle rolls rearward.

In the prior art in which an idle revolution speed of the engine is preset to be high, the problem of rearward vehicle rolling is not significant because of high torque transmitted to the shift mechanism. However, in the recent progression of engine control methods, it has been a trend that idle rpm of the engine is controlled as low as possible because it lowers fuel consumption. Therefore, rearward rolling of a vehicle on a slope has become more problematic in recently produced vehicles.

The prior art in which the shift mechanism of an automatic transmission is maintained at a first shift-speed also causes inconvenience in that a brake pedal must be pushed with a high force to keep the vehicle stationary.

The problem of rearward rolling on a slope and the inconvenience of applying the high braking force needed to hold the vehicle stationary according to the prior art can be solved by maintaining the shift mechanism at a second shift-speed for creep-control, which is herein-after explained in detail with reference to FIG. 3b.

In the second shift-speed, the first operating element N1 is stopped and the second operating element N2 is prevented from turning backward because of the one-way clutch OWC.

Therefore, the point of the output element N3 in the speed diagram cannot be lowered below 0 even in the case when gravitational force acts as a rearward rolling force on the vehicle on a slope, because the speed diagram has a fixed point of the first operating element N1, and the second operating element N2 cannot turn backward.

However, maintaining the shift mechanism in the second shift-speed may cause another problem.

When the accelerator pedal is depressed, the shift mechanism must be transformed into a first shift-speed from the second shift-speed. However, sudden release of the first operating element N1 may cause a shift shock resulting from a sudden stop of the second operating element by the function of the one-way clutch OWC because the vehicle, and more particularly the second operating element N2, may gain a certain amount of speed during the time between releasing a brake pedal and depressing an accelerator pedal.

SUMMARY OF THE INVENTION

The present invention has been made in an effort to solve the problems and inconvenience of creep-control methods of the prior art.

It is an objective of the present invention to provide a creep-control method for an automatic transmission of a vehicle wherein a second shift-speed is maintained to prevent rearward rolling on a slope and shift shock is reduced by optimal control of hydraulic pressure when the creep-control state is released.

To achieve the above objective, the present invention provides a creep-control method for an automatic transmission of a vehicle comprising:

creep-entering, in which a hydraulic circuit of the automatic transmission is controlled to form hydraulic pressure supply lines of a second shift-speed when a predetermined creep-entrance condition is satisfied;

creep-maintaining, in which the formed hydraulic pressure supply lines of the second shift-speed are maintained and a hydraulic supply pressure of the formed hydraulic pressure supply lines is maintained at a predetermined creep duty ratio; and creep-escaping, in which one of controlling the hydraulic circuit to engage a second shift-speed shift mechanism of the automatic transmission and controlling the hydraulic circuit to engage a first shift-speed shift mechanism of the automatic transmission is selectively performed based on a vehicle speed and throttle valve open-angle when a predetermined creep-escape condition is satisfied.

The creep-entrance condition is calculated based on a logical multiplication of a shift lever of the automatic transmission being disposed at a forward drive range position except a low "L" range, the vehicle speed being less than a first predetermined speed, the throttle valve open-angle being less than a first predetermined open-angle, and a speed shift based on a predetermined shift pattern not being required.

The predetermined creep duty ratio in the creep-maintaining is higher than 0 and lower than its maximum duty ratio.

The creep-escape condition is calculated based on a logical sum of the shift lever of the automatic transmission being disposed at a position of low "L", park "P", reverse "R", and neutral "N" ranges, the vehicle speed being higher than a second predetermined speed, the throttle valve open-angle being greater than a second predetermined open-angle, and a shift-speed of the automatic transmission being required to be maintained at the second shift-speed.

The second predetermined speed is higher than the first predetermined speed and also higher than a threshold speed for a 2→1 speed shift according to a predetermined 2→1 shift pattern, and the second predetermined open-angle is greater than the first predetermined open-angle.

In the creep-escaping, the controlling the hydraulic circuit to engage the second shift-speed shift mechanism of the automatic transmission is performed when at least one condition of the vehicle speed being higher than a second predetermined speed, and a shift-speed of the automatic transmission being required to be maintained at the second shift-speed is satisfied, wherein the controlling the hydraulic circuit to engage the second shift-speed shift mechanism of the automatic transmission comprises performing resident steps of a predetermined 1→2 speed shift control method, the resident steps being determined on the basis of the vehicle speed and the creep duty ratio for the hydraulic supply pressure of the formed hydraulic pressure supply lines of the second shift-speed.

In the creep-escaping, the controlling the hydraulic circuit to engage the first shift-speed shift mechanism of the automatic transmission is performed under the condition of the throttle valve open-angle being greater than the second predetermined open-angle, wherein the controlling the hydraulic circuit to engage the first shift-speed shift mechanism of the automatic transmission comprises:

duty ratio adjusting, in which a duty ratio for the hydraulic supply pressure of the hydraulic pressure supply lines of the second shift-speed is suddenly lowered from the creep duty ratio by a predetermined adjust value;

first ramp-controlling, in which the duty ratio for the hydraulic supply pressure is gradually lowered until a turbine-rpm is increased by a predetermined rpm;

duty ratio holding, in which the duty ratio for the hydraulic supply pressure is suddenly increased by a predetermined ratio and the increased duty ratio is held for a predetermined duration if the turbine-rpm is increased by the predetermined rpm in the first ramp-controlling;

second ramp-controlling, in which the duty ratio for the hydraulic supply pressure is gradually lowered until the turbine-rpm becomes within a predetermined range from a target rpm of the first shift-speed; and transforming the hydraulic pressure supply lines to be hydraulic pressure supply lines of the first shift-speed.

The predetermined adjust value by which the duty ratio is suddenly lowered in the duty ratio adjusting is calculated by an increasing function of each of vehicle speed and throttle valve open-angle.

The predetermined ratio by which the duty ratio is suddenly increased in the duty ratio holding is calculated by an increasing function of vehicle speed.

At least one of the first ramp-controlling, duty ratio holding, and second ramp-controlling is performed within a predetermined period of time.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
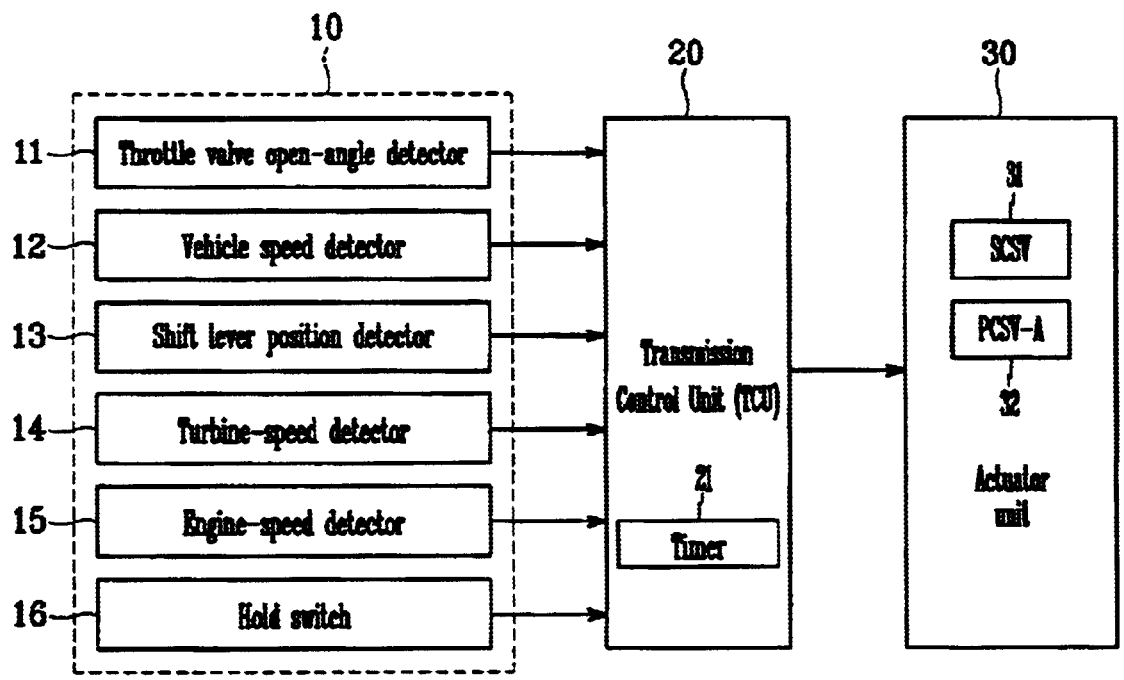
FIG. 1 is a block diagram of a control apparatus for a conventional automatic transmission according to the prior art and a preferred embodiment of the present invention.
Figure 2A:
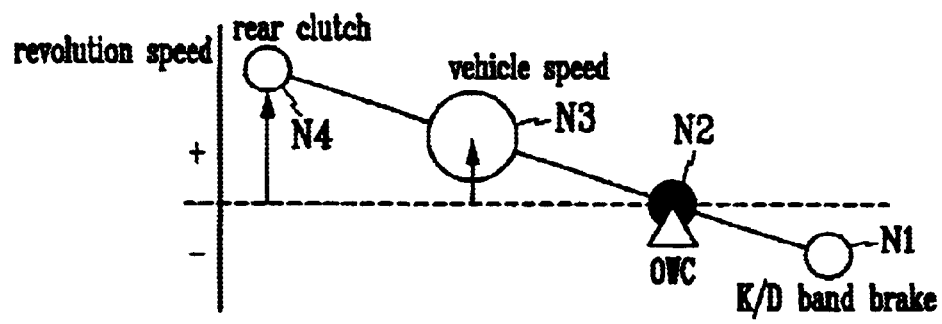
FIGS. 2a, 2b, and 2c are speed diagrams showing a first shift-speed of a conventional four-speed automatic transmission.
Figure 2B:
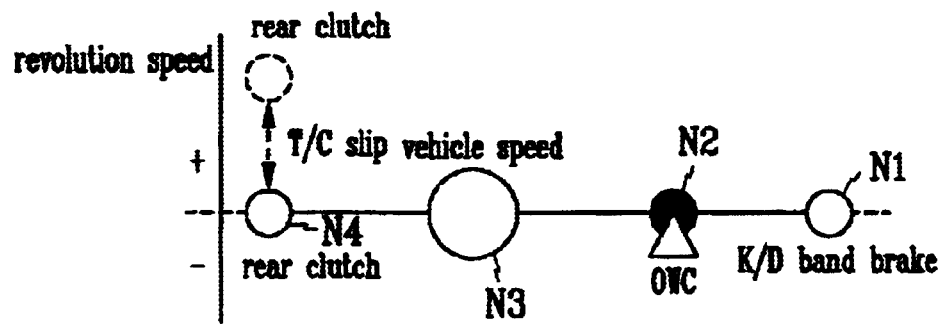
Figure 2C:
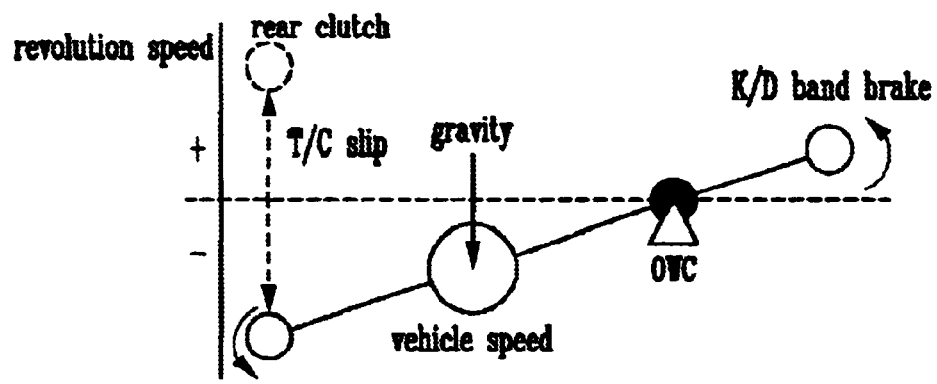
Figure 3A:
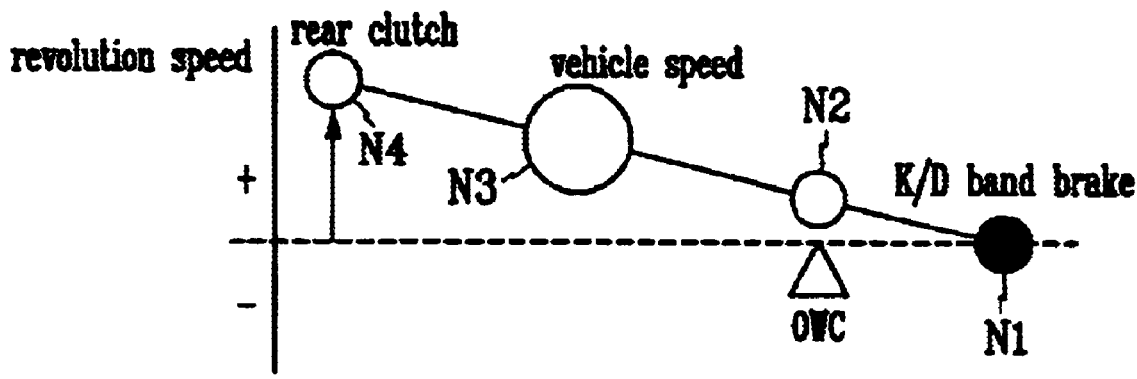
FIGS. 3a and 3b are speed diagrams showing a second shift-speed of a conventional four-speed automatic transmission.
Figure 3B:
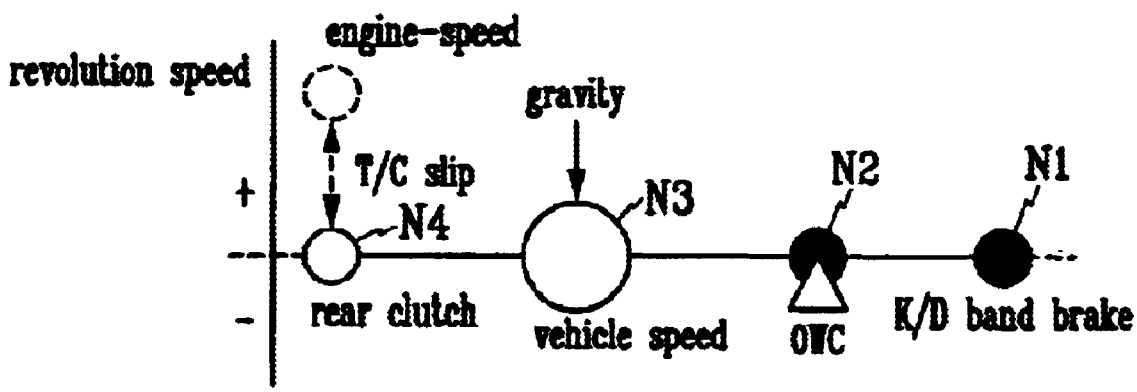
Figure 4:
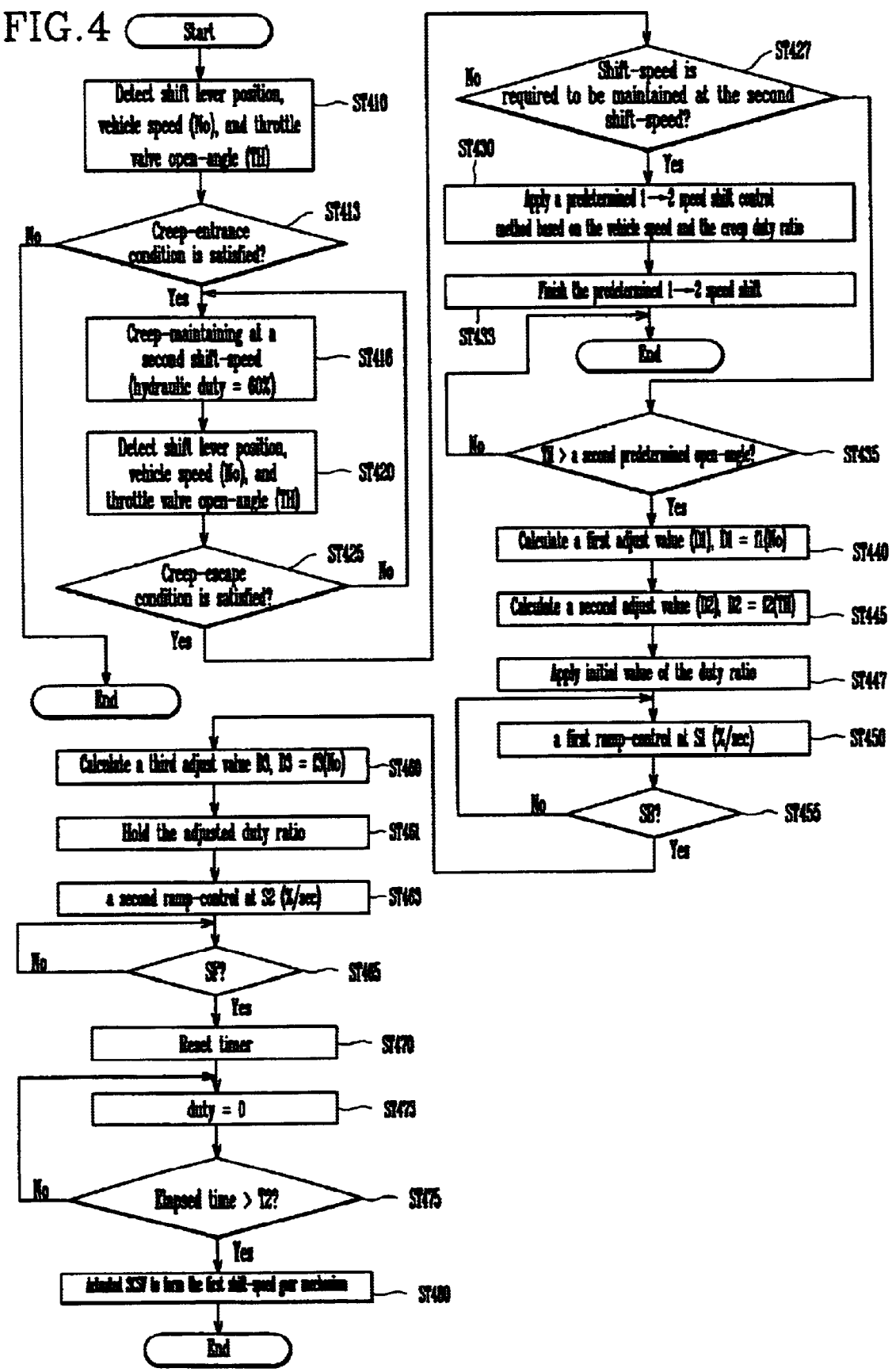
FIG. 4 is a flowchart showing a creep-control method according to a preferred embodiment of the present invention.

FIG. 1 is a block diagram of a creep-control apparatus for an automatic transmission according to a preferred embodiment of the present invention.

As shown in FIG. 1, the creep-control apparatus according to a preferred embodiment of the present invention includes a driving-state detecting unit 10 for detecting a plurality of vehicle driving-state factors, a transmission control unit (referred to as "TCU" hereinafter) 20 for determining an optimal shift pattern for the detected driving state and for controlling hydraulic shifting according to the determined optimal shift pattern, and an actuator unit 30 for performing hydraulic shifting according to the control of the TCU 20.

The actuator unit 30 includes a plurality of solenoid valves activated by a duty signal from the TCU 20 to form hydraulic pressure supply lines according to each shift-speed and to form hydraulic supply pressure in the formed hydraulic pressure supply lines. A specific structure of the plurality of solenoid valves is obviously determined by a person ordinarily skilled in the art of automatic transmissions.

More particularly, the actuator unit 30 can include a shift control solenoid valve (referred to as "SCSV" hereinafter) 31 for forming hydraulic pressure supply lines for supplying hydraulic pressure to friction elements that are operated in a target shift-speed, and a pressure control solenoid valve (referred to as "PCSV-A" hereinafter) 32 for controlling the hydraulic pressure supplied to the friction elements through the formed hydraulic pressure supply lines.

The driving-state detecting unit 10 includes a throttle valve open-angle detector 11 for detecting an open-angle of the throttle valve, a vehicle speed detector 12 for detecting a speed of the vehicle, a shift-lever position detector 13 for detecting a position of the shift lever, a turbine-speed detector 14 for detecting a revolution speed of the turbine in a torque converter (not shown), an engine-speed detector 15 for detecting a revolution speed of the engine, and a hold switch 16 for generating a signal that the shift-speed is required to be maintained in a second shift-speed.

The TCU 20 is preferably realized as an electronic control unit including a microprocessor equipped with a timer 21.

According to the embodiment of the present invention, it is determined whether a predetermined creep-entrance condition or a predetermined creep-escape condition is satisfied, in order to determine whether the automatic transmission should be controlled in a creep state or if the controlling of the automatic transmission in the creep state should be terminated. Information that is used to determine whether those conditions are satisfied includes shift lever position, vehicle speed, and throttle valve open-angle.

The position of the shift lever in various ranges such as park "P", reverse "R", neutral "N", drive "D", second "2", and low "L" ranges is detected at the shift lever position detector 13, the vehicle speed is detected at the vehicle speed detector 12, and the throttle valve open-angle TH is detected at the throttle valve open-angle detector 11. The values detected at the detectors 11, 12, and 13 are transmitted to the TCU 20 at step S410.

Accordingly, the TCU 20 determines whether a predetermined creep-entrance condition is satisfied at step S413. The predetermined creep-entrance condition is calculated based on a logical multiplication of ① the shift lever of the automatic transmission being disposed at a forward drive range position except at the low "L" range, ② the vehicle speed being less than a first predetermined speed, ③ the throttle valve open-angle being less than a first predetermined throttle valve open-angle, and ④ a speed shift based on a predetermined shift pattern not being required.

The first predetermined speed is preset based on the values of revolution speed of a transfer drive gear, which is preferably preset as a vehicle speed at which the revolution speed of the transfer drive gear corresponds to 320 rpm. The first predetermined throttle valve open-angle is set sufficiently low in order to have the automatic transmission creep-controlled only at a very low engine load, and a preferable example of the first predetermined throttle valve open-angle is 3.5%.

If the creep-entrance condition is determined to be satisfied, the TCU 20 performs creep-control in a second shift-speed at step S416. The creep-control in the second shift-speed is described in more detail hereinafter.

In the creep-control in the second shift-speed, the TCU 20 controls the actuator unit 30 such that the hydraulic circuit of the automatic transmission forms hydraulic pressure supply lines corresponding to the second shift-speed, and a duty ratio for hydraulic supply pressure of the hydraulic pressure supply lines is set as a predetermined creep duty ratio. In further detail, the SCSV 31 is actuated to form hydraulic lines to supply a kick-down brake (referred to as "K/D brake" hereinafter) with hydraulic pressure, and the duty ratio of the PCSV-A 32 is set as the creep duty ratio. The creep duty ratio, predetermined to be higher than 0 and lower than its maximum duty ratio, can be varied according to various types of transmissions, and a preferable example of the creep duty ratio is 60%.

There are three ways that the vehicle driving state enters into the creep-control state in the second shift-speed.

In the first way where the shift lever is trans-positioned from "N" to "D" with all other sub-conditions satisfied, the creep duty ratio is applied as soon as a predetermined "N" to "D" speed-shift control terminates.

In the second way where the vehicle speed becomes lower than the first predetermined speed, speed shifting to the first speed is performed first, and subsequently 1→2 speed shifting under a power-mode is performed. The creep duty ratio is applied at the time the 1→2 speed shift is finished.

In the third way, where the automatic transmission is already maintained at the second speed, the creep duty ratio can be applied immediately.

While performing creep-control in a second shift-speed at step S416, the TCU 20 continually detects shift lever position, vehicle speed, and throttle valve open-angle at step S420 and determines whether a predetermined creep-escape condition is satisfied at step S425.

If the predetermined creep-escape condition is not satisfied, the TCU 20 continues its creep-control in the second shift-speed of step S416, and if the predetermined creep-escape condition is satisfied, the TCU 20 performs a predetermined creep-escape control.

The creep-escape condition may be set as a logical negation of the predetermined creep-entrance condition. However, in this case, if the vehicle driving state continuously varies slightly near the threshold state whereby the creep-entrance condition is satisfied, for example, if the throttle valve open-angle is varied around the first predetermined throttle valve open-angle, frequent control of creep-entrance and creep-escape will be caused. Therefore, the creep-escape condition is preferably set independently from the creep-entrance condition.

A preferable example of the creep-escape condition is calculated as a logical sum of ① the shift lever of the automatic transmission being disposed at a position of low "L", park "P", reverse "R", and neutral "N" ranges, ② the vehicle speed being higher than a second predetermined speed, ③ a throttle valve open-angle being greater than a second predetermined throttle valve open-angle, and ④ a shift-speed of the automatic transmission being required to be maintained at the second shift-speed.

Whether the shift-speed of the automatic transmission is required to be maintained at the second shift-speed can be determined on the basis of whether the hold switch 16 is actuated.

The second predetermined speed is set higher than the first predetermined speed, and preferably also higher than a threshold speed for a 2→1 speed shift according to a predetermined 2→1 shift pattern, because otherwise a 2→1 speed shift can occur when the vehicle speed becomes higher than the second predetermined speed and a 1→2 speed shift occurs when the vehicle speed becomes higher than a threshold speed for a 1→2 speed shift according to a predetermined 1→2 shift pattern. The second predetermined speed is preferably set as a vehicle speed at which the revolution speed of the transfer drive gear corresponds to 330 rpm.

The second predetermined throttle valve open-angle is set greater than the first predetermined throttle valve open-angle and is preferably set as 5%.

Three ways that the vehicle driving state escapes from the creep-control state are described hereinafter in detail.

The first way is that the creep-escape condition is satisfied because the vehicle speed is increased or the hold switch is actuated. In this case, the hydraulic lines and hydraulic pressure must be controlled correspondingly to the second shift-speed.

The TCU 20 determines whether a shift to the second shift-speed is required at step S427. It is determined that a shift to the second shift-speed is required at step S427 if the vehicle speed is increased to higher than the second predetermined speed or the hold switch 16 is in an ON state.

When the shift to the second shift-speed is required, the TCU 20 performs resident steps of a predetermined 1→2 speed shift control method at step S430, where the resident steps are determined on the basis of the vehicle speed and the creep duty ratio for the hydraulic supply pressure of the formed hydraulic pressure supply lines of the second shift-speed. When the shift to the second shift-speed is finished at step S433, the creep-control according to the preferred embodiment of this invention ends.

The second way is that the creep-escape condition is satisfied because the shift lever is trans-positioned to a range other than a forward drive range except "L" range. In this case, a predetermined shift control to the corresponding shift-speed must be performed.

If the shift lever is trans-positioned to one of the "P", "R", and "N" ranges, a predetermined shift-control according to the prior art may be performed.

When the shift lever is trans-positioned to the "L" range, it is determined whether the vehicle speed equals 0. If the vehicle speed equals 0, the hydraulic pressure supplied to the K/D brake is immediately released so no shift shock will occur. If the vehicle speed does not equal 0, the TCU 20 performs resident steps of a predetermined 2→1 speed shift control method, the resident steps being determined on the basis of the vehicle speed and the creep duty ratio for the hydraulic supply pressure of the formed hydraulic pressure supply lines of the second shift-speed.

The third way is that the creep-escape condition is satisfied because the throttle valve open-angle becomes higher than the second predetermined throttle valve open-angle. In this case, the hydraulic lines and hydraulic pressure must be controlled to shift the speed of the transmission into the first shift-speed, which is described in detail hereinafter with reference to FIG. 5, which is a graph showing a duty map used for a creep-escape control in a creep-control method according to a preferred embodiment of the present invention.

The TCU 20 determines whether the throttle valve open-angle is greater than the second predetermined throttle valve open-angle at step S435.

When it is determined that the throttle valve open-angle is greater than the second predetermined throttle valve open-angle, the TCU 20 adjusts the duty of the PCSV-A 32 on the basis of the vehicle speed No and the throttle valve open-angle TH at steps of S440, S445, and S447.

The TCU 20 calculates a first adjust value D1 on the basis of the vehicle speed No by a function f1 at step S440, such that D1=f1(No).

The function f1 is preset as an increasing function of the vehicle speed No in order to accelerate speed shifting to the first shift-speed when the vehicle speed is high. For calculation in the TCU 20, the function f1 is preferably set as an increasing step function of 8 steps.

The TCU 20 further calculates a second adjust value D2 on the basis of the change rate $\Delta TH$ of the throttle valve open-angle by a function f2 at step S445, such that D2=f2($\Delta TH$), to improve shift response when the accelerator pedal is rapidly depressed. Therefore, the function f2 is preset as an increasing function of the change rate $\Delta TH$.

Figure 5:
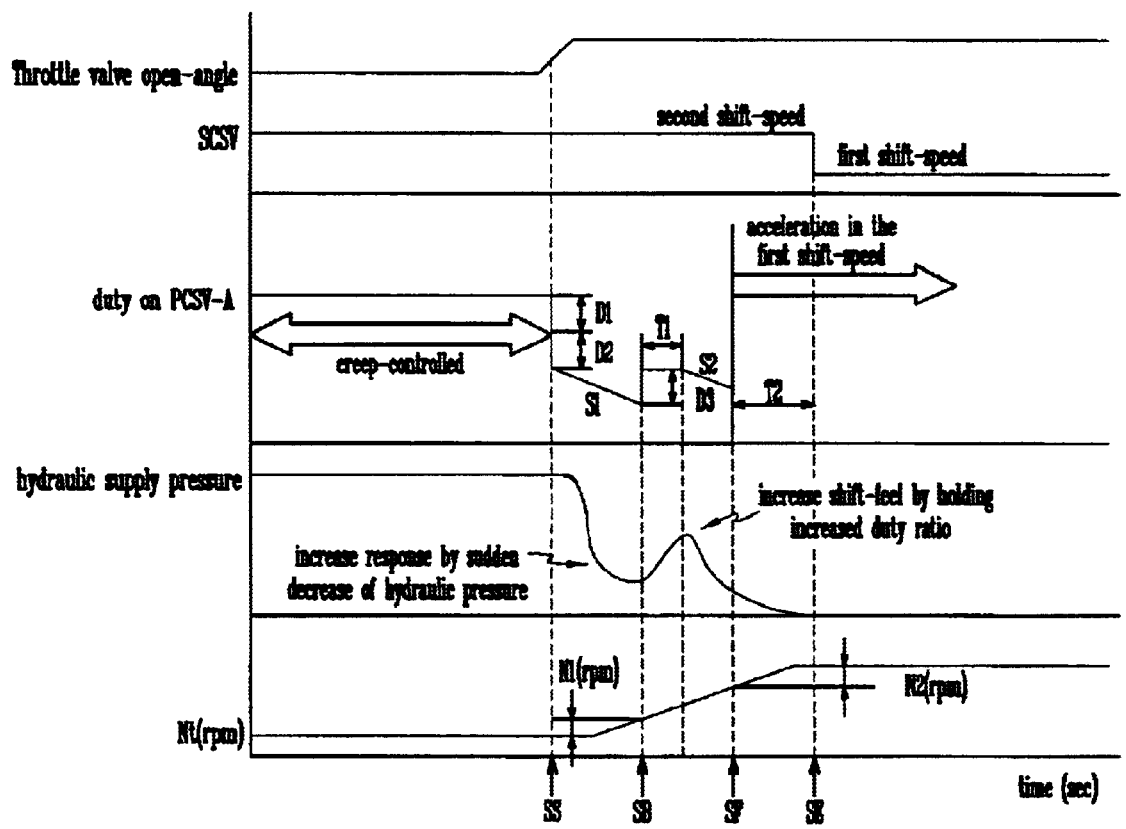
FIG. 5 is a graph showing a duty map used for creep-escape control in a creep-control method according to a preferred embodiment of the present invention.

An initial value of the duty ratio is calculated by subtracting the first and second adjust values D1 and D2 from the creep duty ratio, and the calculated initial value of the duty ratio is immediately applied at step S447 (refer to SS in FIG. 5).

Subsequently the TCU 20 performs first ramp-controlling, in which the duty ratio for the hydraulic supply pressure is gradually lowered at step S450 until a turbine-rpm is increased by a predetermined rpm N1 at step S455 (refer to SB in FIG. 5). The slope of the first ramp S1 is preferably predetermined as −30%/sec. Shift response to the acceleration is improved by the first ramp-controlling. The turbine-rpm becomes higher as the first ramp-controlling is performed, and the point at which the turbine-rpm becomes larger by the predetermined rpm N1 (for example, 35 rpm) is called SB, denoting that an actual shift begins.

At the point SB, the TCU 20 suddenly increases the duty ratio for the hydraulic supply pressure by a predetermined ratio D3 and holds the increased duty ratio for a predetermined duration T1 at steps S460 and S461.

The predetermined ratio D3 is calculated on the basis of the vehicle speed No by a function of f3 at step S460, such that D3=f3(No).

The function f3 is preset to an increasing function of the vehicle speed No, and is preferably set as an increasing step function of 8 steps for calculation in the TCU 20. The predetermined duration T1 is preferably set to 100 ms.

By holding the increased duty ratio for the predetermined duration T1, hydraulic pressure supplied to the K/D brake is increased and therefore shift shock caused by sudden release of hydraulic pressure supplied to the K/D brake is reduced.

At the time when the predetermined duration T1 has elapsed, the TCU 20 performs second ramp-controlling, in which the duty ratio for the hydraulic supply pressure is gradually lowered at step S463 until the turbine-rpm becomes within a predetermined range N2 from the target rpm of the first shift-speed at step S465 (refer to SF in FIG. 5). The slope of the first ramp S2 is preferably predetermined as −15%/sec.

The point at which the turbine-rpm becomes within the predetermined range N2 (for example, 100 rpm) from the target rpm of the first shift-speed is called SF denoting that an actual shift is finished.

At the point SF, the TCU 20 resets the timer 21, starts measuring time, and sets the duty ratio of the PCSV-A to zero in order to fully disengage the K/D brake at step S470.

After the point SF, even though the hydraulic lines are formed for the second shift-speed, a first speed shift mechanism is realized because hydraulic pressure is not supplied to the K/D brake, and the one-way clutch OWC still functions. Therefore, a 2→1 speed shift is realized by controlling the duty ratio for hydraulic pressure.

The time measured by the timer 21 of the TCU 20 is compared with a predetermined time T2 at step S475.

When the time measured by the timer 21 is larger than the predetermined time T2 at step S475, the TCU 20 transforms the hydraulic pressure supply lines to supply hydraulic pressure for the first shift-speed by actuating the SCSV 31 at step S480.

Therefore, the time T2 is predetermined to be long enough to ensure that the changing of hydraulic lines from the second shift-speed to the first shift-speed does not incur a shock or overrun the turbine rpm.

In the steps of creep-escaping described with reference to steps S435–S480, at least one of the first ramp-controlling, duty ratio holding, and second ramp-controlling is limited to be performed within a predetermined period of time-in order to prevent too much time elapsing while creep-escaping.

According to the present invention, rearward rolling on a slope is prevented by maintaining the shift-speed of an automatic transmission in the second shift-speed, and shift shock is reduced by optimal shift control from the second shift-speed to a target shift-speed when a creep-control state is released.

Furthermore, if throttle valve open-angle is wider than a predetermined level, the hydraulic system is rapidly transformed to the first speed on the basis of change rate of the throttle valve open-angle.

The present invention also reduces effort needed to depress a brake pedal to hold a vehicle stopped because the second shift-speed is maintained in the creeping state.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A creep-control method for an automatic transmission of a vehicle comprising:

creep-entering, in which a hydraulic circuit of the automatic transmission is controlled to form hydraulic pressure supply lines of a second shift-speed when a predetermined creep-entrance condition is satisfied;

creep-maintaining, in which the formed hydraulic pressure supply lines of the second shift-speed are maintained and a hydraulic supply pressure of the formed hydraulic pressure supply lines is maintained at a predetermined creep duty ratio; and creep-escaping, in which one of controlling the hydraulic circuit to engage a second shift-speed shift mechanism of the automatic transmission and controlling the hydraulic circuit to engage a first shift-speed shift mechanism of the automatic transmission is selectively performed based on a vehicle speed and throttle valve open-angle when a predetermined creep-escape condition is satisfied, wherein the creep-escape condition is calculated based on a logical sum of the shift lever of the automatic transmission being disposed at a position of low "L", park "P", reverse "R", and neutral "N" ranges, the vehicle speed being higher than a second predetermined speed, the throttle valve open-angle being greater than a second predetermined open-angle, and a shift-speed of the automatic transmission being required to be maintained at the second shift-speed and in the creep-escaping, the controlling the hydraulic circuit to engage the first shift-speed shift mechanism of the automatic transmission is performed under the condition of the throttle valve open-angle being greater than the second predetermined open-angle, wherein the controlling the hydraulic circuit to engage the first shift-speed shift mechanism of the automatic transmission comprises:

duty ratio adjusting, in which a duty ratio for the hydraulic supply pressure of the hydraulic pressure supply lines of the second shift-speed is suddenly lowered from the creep duty ratio by a predetermined adjust value;

first ramp-controlling, in which the duty ratio for the hydraulic supply pressure is gradually lowered until a turbine-rpm is increased by a predetermined rpm;

duty ratio holding, in which the duty ratio for the hydraulic supply pressure is suddenly increased by a predetermined ratio and the increased duty ratio is held for a predetermined duration if the turbine-rpm is increased by the predetermined rpm in the first ramp-controlling;

second ramp-controlling in which the duty ratio for the hydraulic supply pressure is gradually lowered until the turbine-rpm becomes within a predetermined range from a target rpm of the first shift-speed; and transforming the hydraulic pressure supply lines to be hydraulic pressure supply lines of the first shift-speed.

2. The creep-control method of claim 1, wherein the creep-entrance condition is calculated based on a logical multiplication of a shift lever of the automatic transmission being disposed at a forward drive range position except a low "L" range, the vehicle speed being less than a first predetermined speed, the throttle valve open-angle being less than a first predetermined open-angle, and a speed shift based on a predetermined shift pattern not being required.

3. The creep-control method of claim 1, wherein the predetermined creep duty ratio in the creep-maintaining is higher than 0 and lower than its maximum duty ratio.

4. The creep-control method of claim 1, wherein the second predetermined speed is higher than the first predetermined speed and also higher than a threshold speed for a 2→1 speed shift according to a predetermined 2→1 shift pattern, and the second predetermined open-angle is greater than the first predetermined open-angle.

5. The creep-control method of claim 1, wherein the predetermined adjust value by which the duty ratio is suddenly lowered in the duty ratio adjusting is calculated by an increasing function of each of vehicle speed and change rate of the throttle valve open-angle.

6. The creep-control method of claim 1, wherein the predetermined ratio by which the duty ratio is suddenly increased in the duty ratio holding is calculated by an increasing function of vehicle speed.

7. The creep-control method of claim 1, wherein at least one of the first ramp-controlling, duty ratio holding, and second ramp-controlling is performed within a predetermined period of time.

* * * * *